(12) United States Patent
Ohtake

(10) Patent No.: US 9,154,382 B2
(45) Date of Patent: Oct. 6, 2015

(54) INFORMATION PROCESSING SYSTEM

(75) Inventor: Takamasa Ohtake, Tokyo (JP)

(73) Assignee: NEC Corporation, Tokyo (JP)

( * ) Notice: Subject to any disclaimer, the term of this patent is extended or adjusted under 35 U.S.C. 154(b) by 761 days.

(21) Appl. No.: 13/401,019

(22) Filed: Feb. 21, 2012

(65) Prior Publication Data

US 2012/0215876 A1    Aug. 23, 2012

(30) Foreign Application Priority Data

Feb. 23, 2011    (JP) ................................ 2011-036660

(51) Int. Cl.
*G06F 15/16* (2006.01)
*H04L 12/24* (2006.01)
*G06F 15/173* (2006.01)

(52) U.S. Cl.
CPC .......... *H04L 41/0893* (2013.01); *H04L 41/044* (2013.01)

(58) Field of Classification Search
CPC ... H04L 41/0893; H04L 41/044; H04L 45/46; H04W 40/32
USPC ................... 709/201, 203, 208, 223, 238, 244
See application file for complete search history.

(56) References Cited

U.S. PATENT DOCUMENTS

| | | | | |
|---|---|---|---|---|
| 6,047,323 | A * | 4/2000 | Krause | 709/227 |
| 6,633,538 | B1 | 10/2003 | Tanaka et al. | |
| 7,483,998 | B2 * | 1/2009 | Rabinovitch | 709/238 |
| 7,620,370 | B2 * | 11/2009 | Barak et al. | 455/67.13 |
| 2002/0120717 | A1 * | 8/2002 | Giotta | 709/219 |
| 2003/0204623 | A1 * | 10/2003 | Cain | 709/241 |
| 2005/0108425 | A1 * | 5/2005 | Rabinovitch | 709/238 |
| 2008/0027920 | A1 * | 1/2008 | Schipunov et al. | 707/4 |
| 2008/0090575 | A1 * | 4/2008 | Barak et al. | 455/444 |
| 2008/0098113 | A1 * | 4/2008 | Hansen et al. | 709/226 |

FOREIGN PATENT DOCUMENTS

| | | |
|---|---|---|
| CN | 101496012 A | 7/2009 |
| JP | 2000-010949 A | 1/2000 |

(Continued)

OTHER PUBLICATIONS

Extended European Search Report dated May 9, 2012.

(Continued)

*Primary Examiner* — Emmanuel L Moise
*Assistant Examiner* — Vitali Korobov
(74) *Attorney, Agent, or Firm* — McGinn IP Law Group, PLLC

(57) ABSTRACT

An information processing system includes a master node and a plurality of cluster nodes managed by the master node, and stores a node list having set a transfer sequence of the request information sent from the master node to the cluster nodes. The cluster nodes accept the request information to transfer the same to the next transfer destinations according to the node list or to the master node if the next transfer destinations do not exist. The master node sends the request information to one of the cluster nodes according to the node list, and divides the plurality of cluster nodes into a cluster node group positioned under the management of the master node and another cluster node group positioned under the management of a predetermined cluster node according to the time interval after sending the request information until receiving the request information from other cluster nodes.

9 Claims, 13 Drawing Sheets

(56) References Cited

FOREIGN PATENT DOCUMENTS

| WO | WO 2008/013632 A1 | 1/2008 |
| WO | WO 2008/049094 A2 | 4/2008 |

OTHER PUBLICATIONS

Chinese Office Action dated May 26, 2015 with English Translation.

\* cited by examiner

Fig.4

| [IDENTIFIER] | [STATUS] | [TRANSFER SEQUENCE] |
|---|---|---|
| NODE 1 | NORMAL | 1 |
| NODE 2 | NORMAL | 2 |
| ⋮ | | |
| NODE K−1 | NORMAL | k−1 |
| NODE K | NORMAL | k |
| ⋮ | | |
| NODE N | NORMAL | n |

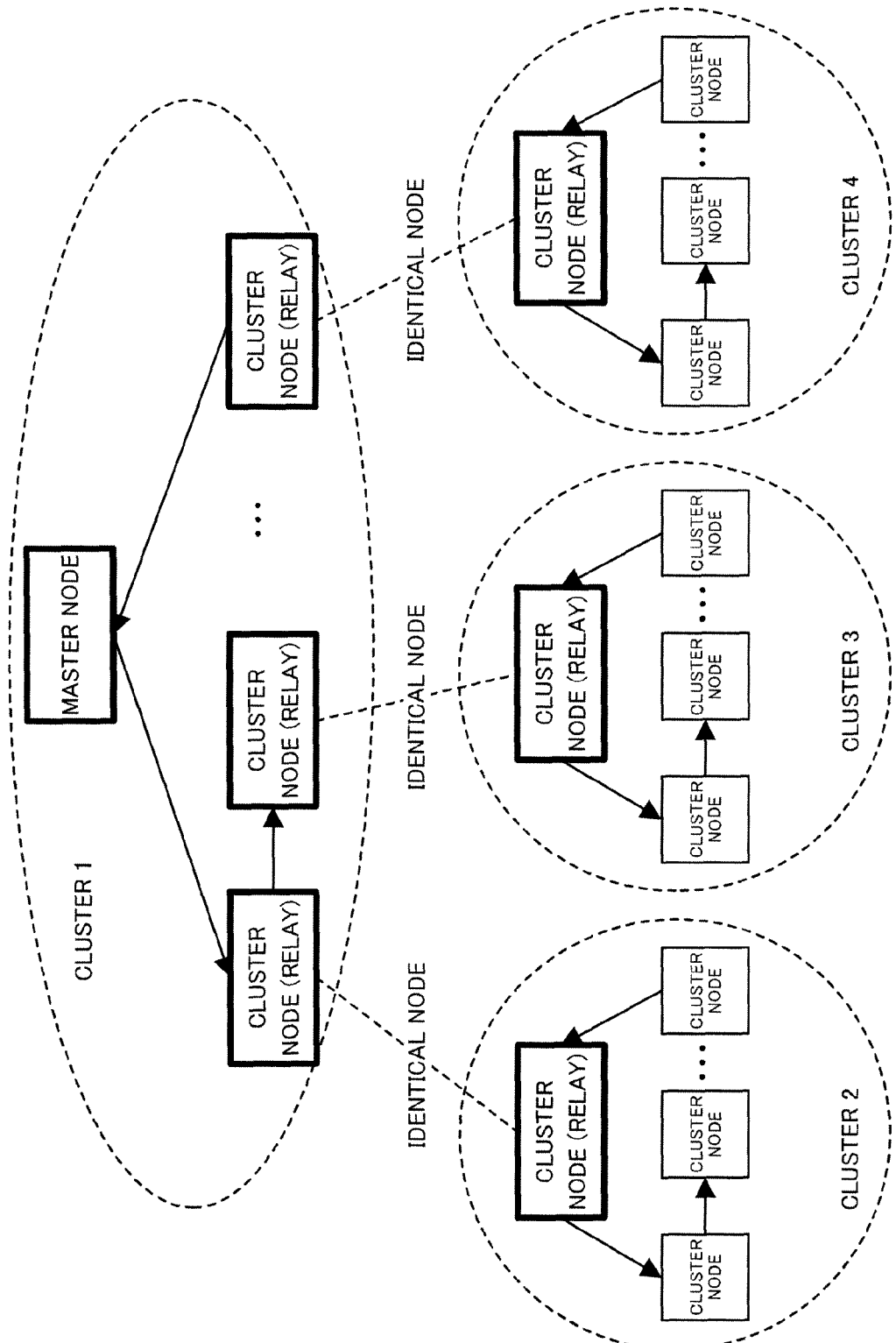

INFORMATION PROCESSING SYSTEM

TECHNICAL FIELD

The present invention relates to information processing systems and, in particular, to an information system composed of a plurality of computers.

BACKGROUND ART

In recent years, because of the emergence of cloud computing and the like, scenes of utilizing a great number of computer resources have been increasing. For example, in a system for realizing cloud computing, there are a plurality of clusters each composed of a plurality of computers (nodes), forming extremely large cluster groups. However, in such situations, although the number of the existing nodes is from thousands to hundreds of thousands, how to construct and manage those nodes still remains a problem.

Here, there are generally one master node and a plurality of cluster nodes in one cluster. Then, since communications between a master node and cluster nodes are commonly carried out on a one-to-one basis, if the master node is to make a request to N cluster nodes, it needs to carry out a request process N times. Hence, increase in the number of cluster nodes results in increase in the same number of the processes carried out by the master node. This brings about a problem that the load on the master node becomes heavy along with the increased number of cluster nodes and, furthermore, it takes more time to transmit the request to all cluster nodes.

Here, the following Patent Document 1 discloses a technique related to an information processing system including a plurality of nodes. In this Patent Document 1, among a plurality of computers connected on a network, if any problem occurs when one monitoring master is carrying out health check on another computer, then the other computer starts the health check on computers of the health check objects of the monitoring master by referring to a management table taken over from the monitoring master and, at the same time, sends the computers a notification of changing the monitoring master. Then, the disclosed technique also shows that each computer on the network carries out the notification of changing the monitoring master in a relaying manner to the computers of the health check objects.

[Patent Document 1] JP 2000-10949 A

However, in the technique described above, when the number of computers is large, there still remains a problem of time increasing for carrying out the notification in a relaying manner. That is, it brings about a problem of taking much time for managing the whole system.

SUMMARY

Therefore, an exemplary object of the present invention is to solve the above problem that the management time increases with respect to an information processing system composed of a plurality of computers.

In order to achieve the above exemplary object, an aspect in accordance with the present invention provides an information processing system including: a master node; and a plurality of cluster nodes managed by the master node, wherein the information processing system stores a node list having set a transfer sequence for transferring request information sent from the master node to the cluster nodes; wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist; wherein the master node includes a request notification unit for sending the request information to one of the cluster nodes according to the node list, and a cluster division unit for dividing the plurality of cluster nodes according to the time interval after sending the request information until receiving the request information sent from other of the cluster nodes; and wherein the cluster division unit divides the plurality of cluster nodes into a first cluster node group positioned under the management of the master node, and a second cluster node group positioned under the management of a predetermined cluster node.

Further, another aspect in accordance with the present invention provides a master node for managing a plurality of cluster nodes, the master node storing a node list having set a transfer sequence for transferring request information sent from the master node to the cluster nodes, the master node including: a request notification unit for sending the request information to one of the cluster nodes according to the node list; and a cluster division unit for dividing the plurality of cluster nodes according to the time interval after sending the request information until receiving the request information sent from other of the cluster nodes, wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist; and wherein the cluster division unit divides the plurality of cluster nodes into a first cluster node group positioned under the management of the master node, and a second cluster node group positioned under the management of a predetermined cluster node.

Further, still another aspect in accordance with the present invention provides a computer program installed into a master node storing a node list having set a transfer sequence for transferring request information to a plurality of cluster nodes to manage the cluster nodes, the computer program including instructions for causing the master node to realize: a request notification unit for sending the request information to one of the cluster nodes according to the node list; and a cluster division unit for dividing the plurality of cluster nodes according to the time interval after sending the request information until receiving the request information sent from other of the cluster nodes, wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist; and wherein the cluster division unit divides the plurality of cluster nodes into a first cluster node group positioned under the management of the master node, and a second cluster node group positioned under the management of a predetermined cluster node.

Further, still another aspect in accordance with the present invention provides an information processing method based on an information processing system including a master node, and a plurality of cluster nodes managed by the master node, the method including: sending request information to one of the cluster nodes according to a node list having set a transfer sequence for transferring the request information sent from the master node to the cluster nodes, by means of the master node; accepting the request information sent from the master node or other of the cluster nodes, transferring the request information to yet other of the cluster nodes which are the next transfer destinations according to the node list, and transferring the request information to the master node if the next transfer destinations do not exist, by means of the cluster nodes; and dividing the plurality of cluster nodes according to the time interval after sending the request information until receiving the request information sent from other of the cluster nodes, by means of the master node, wherein in dividing the plurality of cluster nodes, the master node divides the plurality of cluster nodes into a first cluster node group positioned under the management of the master node, and a second cluster node group positioned under the management or a predetermined cluster node.

Because the present invention is configured in the above manner, it is possible to facilitate the reduction of management time for an information processing system composed of a plurality of computers.

BRIEF DESCRIPTION OF DRAWINGS

FIG. 4 shows an example of a node list;

FIG. 14 shows an example of configuration of the information processing system in accordance with the present invention.

EXEMPLARY EMBODIMENT

A First Exemplary Embodiment

Referring to FIGS. 1 to 14, a first exemplary embodiment of the present invention will be explained hereinbelow. FIGS. 1 to 5 are diagrams for explaining configuration of the information processing system, while FIGS. 6 to 13 are diagrams for explaining the operations. Further, FIG. 14 shows an example of configuration of the information processing system.

[Configuration]

Figure 1:
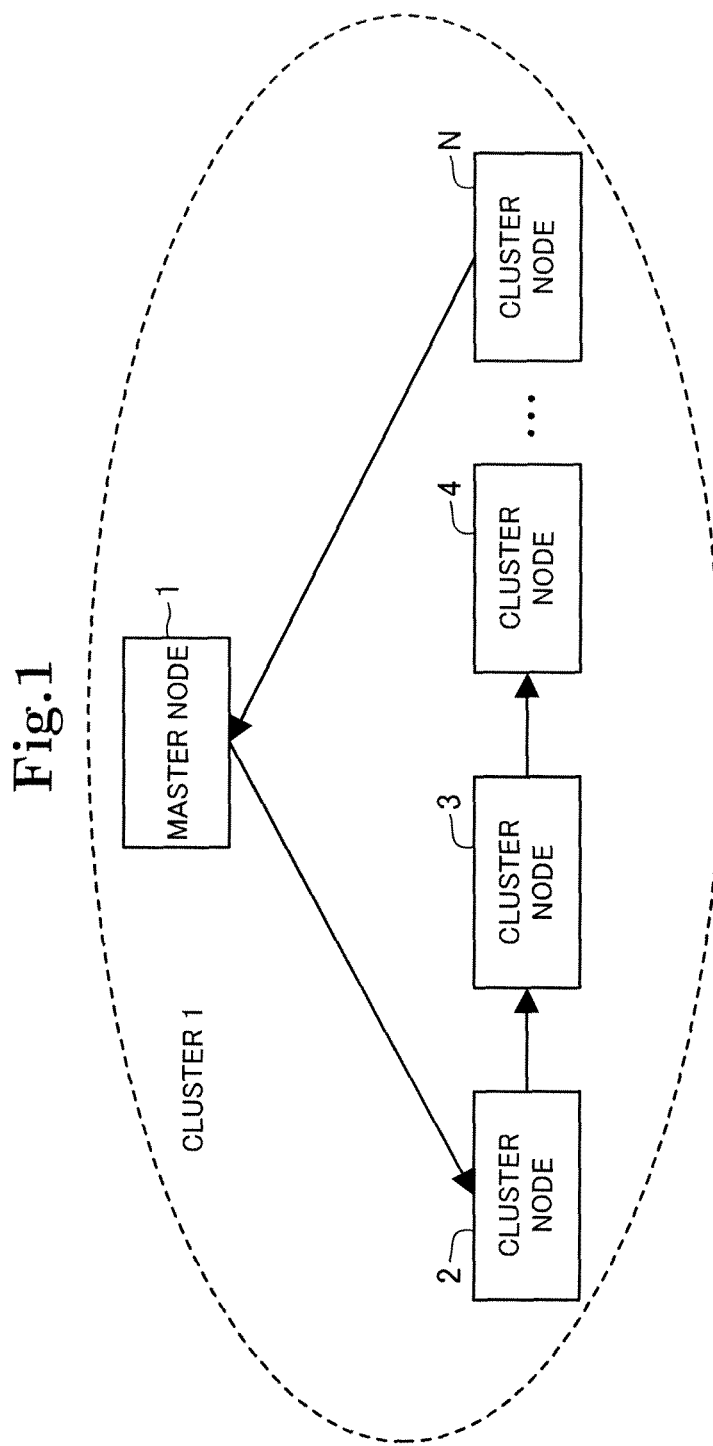
FIG. 1 is a block diagram showing an outline of overall configuration of an information processing system.

An information processing system in accordance with the present invention is a cluster system (to be referred to as a "cluster" hereinbelow) including a plurality of nodes which are information processing devices. Then, as shown in FIG. 1, a cluster is configured to include a master node 1 and at least one cluster nodes N managed by the master node 1. Then, the master node 1 and cluster nodes 2 to N existing in the cluster 1 can communicate with each other, and the cluster nodes 2 to N can also communicate with each other among themselves.

Further, in the exemplary embodiment, each of the nodes 1 to N adopts the same configuration as will be described hereinafter, and is configured to be capable of operating as a master node, a cluster node, or a relay cluster node, respectively. Hereinbelow, referring to FIG. 3, the configuration of a node 101 will be described in detail.

First, the node 101 is an information processing device including a control portion 102 which is a computation device, and a data portion 103 formed in a storage device. The node 101 further includes an operation mode determination processing portion 110, a master node function control portion 120, a cluster node function control portion 130 and a relay cluster node function control portion 140 which are established by installing computer programs into the control portion 102. Further, the data portion 103 stores node lists 151 and 152, and an operation mode 160.

FIG. 4 shows an example of the node lists 151 and 152. A node list is a listing of the nodes existing under a cluster, recording the "identifier" for identifying a node such as the name, IP address and the like of the node, the "status" denoting a state of whether a node is operating normally or abnormally, and the "transfer sequence" denoting in what sequence to transfer a request from the master node. In particular, the node list shown in FIG. 4 is that for the cluster 1 of FIG. 1, storing every node aligned in ascending order of the number of the transfer sequence. Hence, the "node 1", which is the master node with the transfer sequence "1", is stored in the first row, and cluster nodes are stored thereafter. Further, in the example of the node list shown in FIG. 4, in order to simplify the explanation, the transfer sequence is set in ascending order of the identification number of nodes.

Then, the node list described above is stored by each of the nodes 1 to N in the data portion 103 of its own node, so as to store the node list of the cluster to which its own node belongs, respectively. Therefore, in the example of FIG. 1, all nodes 1 to N keep the node list of the cluster 1 shown in FIG. 4, respectively.

Figure 2:
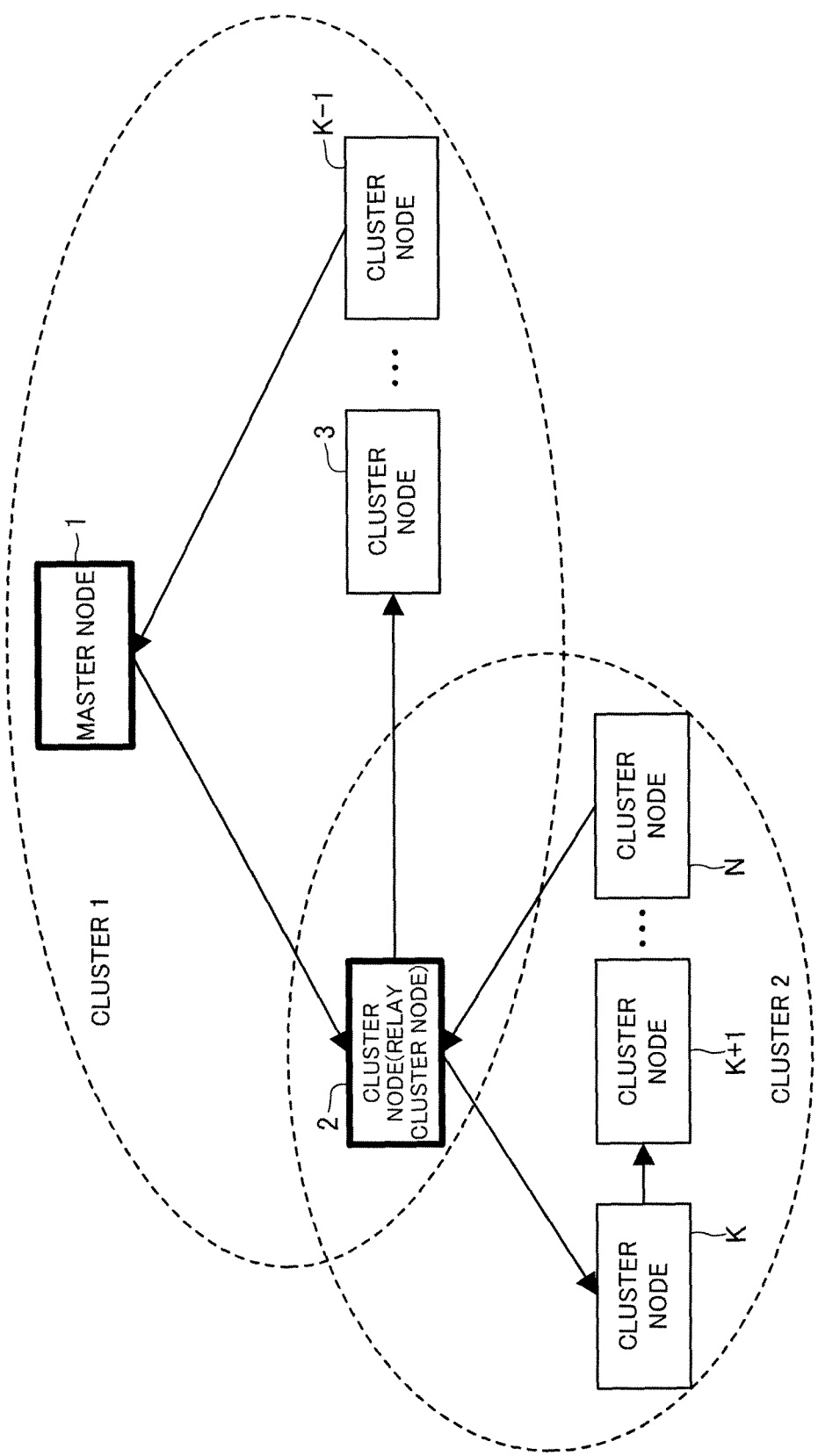
FIG. 2 shows an aspect of dividing a cluster node carried out by the information processing system.

Further, when dividing a cluster as will be described hereinafter, the node list is generated according to each of the divided clusters. Therefore, if the cluster 1 shown in FIG. 1 is divided into another cluster 1 and a cluster 2 such as shown in FIG. 2, then because the cluster node 2 operates as a relay cluster node belonging to both clusters, it possesses two accordingly generated node lists 1 and 2 shown in FIG. 5. The details will be described hereinafter.

Further, the operation mode 160 stored in the data portion 103 is information denoting in which mode the node per se storing this operation mode 160 is operating. Further, there are three operation modes: the "master node mode", the "cluster node mode", and the "relay cluster node mode". Then, the operation mode 160 is determined by the transfer sequence of its own node stored in the node list.

The operation mode determination processing portion 110 decides the operation mode for its own node according to the transfer sequence of its own node in the stored node list. For example, if the transfer sequence of its own node is "1", then the "master node mode" is determined; if the transfer sequence is not "1", then the "cluster node mode" is determined. Further, the operation mode determination processing portion 110 sets the determined result to the operation mode 160 of the data portion 103. Thereby, each of the nodes 1 to N is operated in the mode set to the operation mode 160. Further, descriptions will be made hereinafter with respect to the case of setting the "relay cluster node mode" to the operation mode 160.

Figure 3:
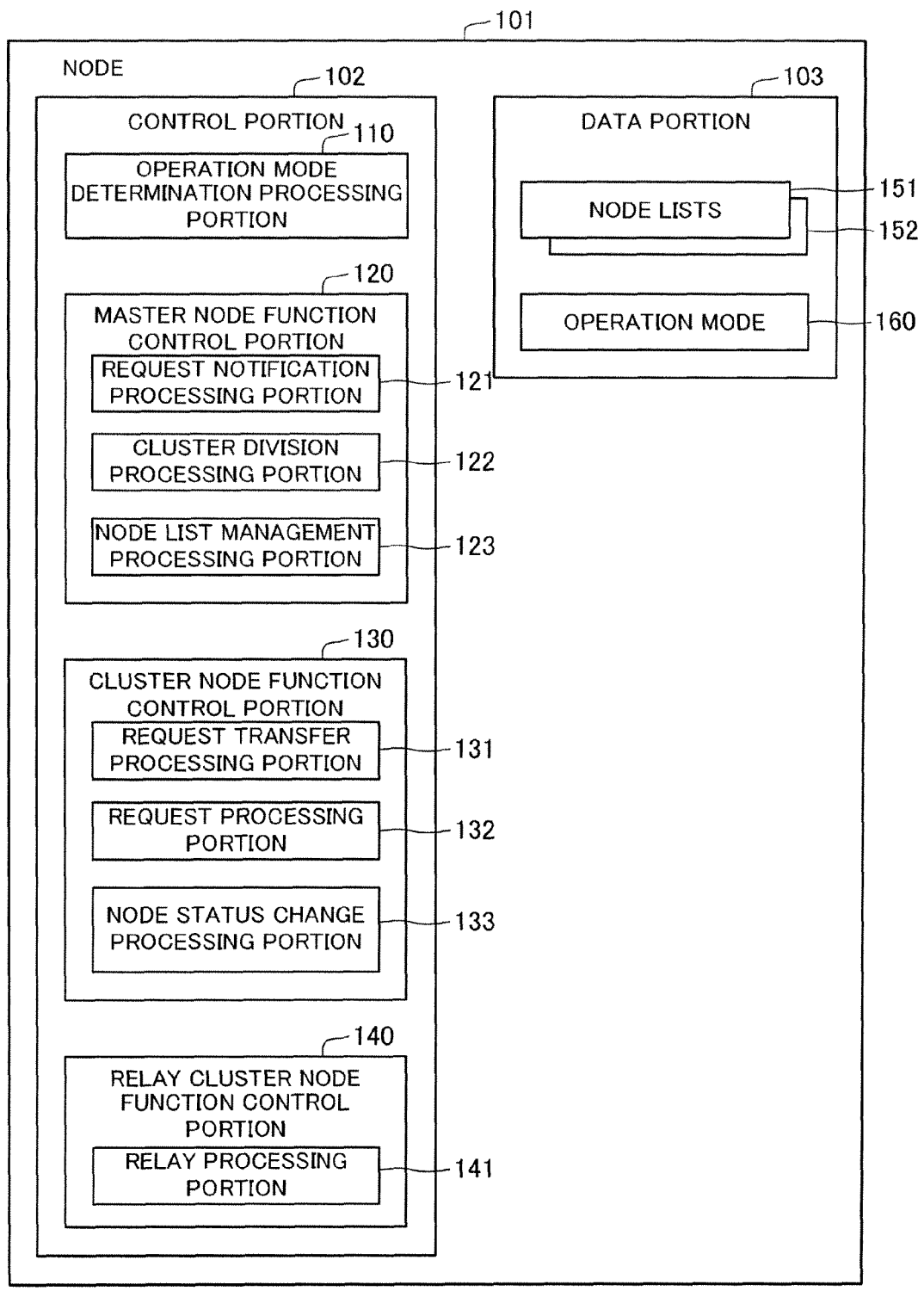
FIG. 3 is a functional block diagram showing a configuration of the nodes constituting the information processing system.

The master node function control portion 120 is a functional constituent acting when the node operates as the master node 1 and, as shown in FIG. 3, includes a request notification processing portion 121, a cluster division processing portion 122, and a node list management processing portion 123.

In order for the master node 1 to stay informed of the status of the cluster nodes 2 to N, the request notification processing portion 121 (the request notification unit) notifies the cluster nodes of a request (request information) to confirm the status with a certain period. At this time, the request notification processing portion 121 refers to the node list stored in the data portion 103 to confirm the first cluster node listed after its own node (the "cluster node 2" in the example of FIG. 1) and the last cluster node (the "cluster node N" in the example of FIG. 1), notifies the first cluster node 2 of the above request, and waits for the request notification from the last cluster node N.

Further, if the request notification has come from the last cluster, node N thereafter, then the request notification processing portion 121 compares the time interval RT after notifying the first cluster node 2 of the request until the coming of the notification from the last cluster node with an arbitrary constant T which is a preset threshold value. If RT is greater than T, then the request notification processing portion 121 requests the cluster division processing portion 122 for a cluster division process. Further, T is taken as the result of adding an arbitrary time-out period to the average time of communications between the nodes multiplied by the node number. However, the above T is not limited to the above resultant value, and the condition for requesting for cluster division is also not limited to that described above.

On receiving the request for the cluster division process from the request notification processing portion 121 as described hereinabove, the cluster division processing portion 122 (the cluster division unit) carries out the process of dividing each node. In particular, it selects the cluster node of the second transfer sequence stored in the node list (the "node 2" in FIG. 4) as the "relay cluster node".

Further, the cluster division processing portion 122 selects an arbitrary node (the "node K−1" in FIG. 4), and creates a "node list 1" denoting the transfer sequence from the first node of the node list, i.e., the master node (1) to the selected arbitrary node (K−1). Further, it creates a "node list 2" combining the "relay cluster node" (2) with the nodes from the node (K) of the transfer sequence next to the selected arbitrary node, to the last node N. At this time, the transfer sequence of the "relay cluster node in the "node list 2" is updated to be "1". By virtue of this, node lists are created respectively with the contents shown in the node lists 1 and 2 of FIG. 5.

Then, as the cluster division processing portion 122 passes the created node lists 1 and 2 to the request notification processing portion 121, the request notification processing portion 121 notifies each cluster node of the transfer as described hereinbefore, and the node list is updated in each node.

Further, the cluster division processing portion 122 notifies the relay cluster node 2 selected as described above of a request to change the operation mode. Thereby, the operation mode determination processing portion 110 of the relay cluster node 2 changes the operation mode 160 to the relay cluster node mode.

By virtue of the cluster division processing portion 122 operating in the above manner, as shown in FIG. 2, the node in the cluster shown in FIG. 1 is divided into the cluster 1 and the cluster 2. In particular, first, the new cluster 1 is constituted by the cluster node group (2 to K−1) positioned under the management of the master node 1. Further, one cluster node 2 of the cluster nodes (2 to K−1) in the cluster 1 is taken as the relay cluster node 2, and the new cluster 2 is constituted by the remaining cluster nodes (K to N) positioned under the management of this relay cluster node 2.

At this time, it h in preferable that the cluster division processing portion 122 divide the cluster into the clusters 1 and 2 such that the number of the cluster nodes positioned under the master node 1 of each of the clusters 1 and 2 or the relay cluster node 2 may be identical. However, the number of the cluster nodes in a divided cluster is not limited to that described above.

Further, on receiving a request to update the node list from a cluster node as will be described hereinafter, the node list management processing portion 123 updates the node list stored in the data portion 103. Further, changing the node list of each of the cluster nodes 2 to N is implemented by carrying out the notification from the request notification processing portion 121 as the request from the master node 1.

Next, the cluster node function control portion 130 will be explained. The cluster node function control portion 130 is a functional constituent acting when the nodes operate as the cluster nodes 2 to N and, as shown in FIG. 3, includes a request transfer processing portion 131, a request processing portion 132, and a node status change processing portion 133.

If the request notification has come from the master node 2 or other cluster nodes 2 to N, then the request transfer processing portion 131 (the request transfer unit) accepts the request, and refers to the node list of the data portion 103. Then, excluding the nodes abnormal in status in the node list, it transfers the request to the other cluster nodes listed after its own node. At this time, if there is no cluster node in the node list to transfer next, then the request transfer processing portion 131 transfers the request to the master node 1.

The request processing portion 132 carries out the process in response to the request from the maser node such as the process of confirming the status of the cluster nodes from the master node 1, the process of updating the node list, and the like.

If no response is made by the cluster node of the transfer destination to which the request is transferred by the request transfer processing portion 131 described hereinbefore, then the node status change processing portion 133 changes the status of the corresponding node to abnormal in the node list of the data portion 103. Further, the node status change processing portion 133 requests the master node 1 to update the node list, and lets the request transfer processing portion 131 carry out the process of transferring the request over again.

Next, the relay cluster node function control portion 140 will be explained. The relay cluster node function control portion 140 is a functional constituent acting when the node operates as the relay cluster node 2 and, as shown in FIG. 3, includes a relay processing portion 141.

The relay processing portion 141 has a function (a request transfer unit) for passing the request information from the master node 1 to the request notification processing portion 121 to let the request notification processing portion 121 transfer the request information to other cluster nodes positioned under the cluster 2 of its own node. That is, if the cluster is divided as shown in FIG. 2, then the relay cluster node 2 belongs to both clusters (the cluster 1 and the cluster 2). Therefore, as described hereinbefore, it acts as the cluster node 2 in the cluster 1 and, meanwhile, it also acts as the master node in the cluster 2. Hence, the relay cluster node 2 refers to the node list of the cluster 1 as a cluster node in the cluster 1 and transfers the request information to the next cluster node and, at the same time, refers to the node list of the cluster 2 as the master node in the cluster 2 and transfers the request information to the next cluster node positioned thereunder.

[Operations]

Next, referring to the flowcharts of FIGS. 6 to 13, operations of the aforementioned information processing system will be explained. Further, the cluster state shown in FIG. 1 is taken as the initial state.

First, the nodes 1 to N each decide the operation mode by means of the operation mode determination processing portion 110. The operation due to the operation mode determination processing portion 110 will be explained in reference to FIG. 6. Initially, the operation mode determination processing portion 110 acquires the node list stored in the data portion 103 of its own node (step S1), and acquires the transfer sequence of its own node from the node list (step S2). Next, if the transfer sequence is "1" (Yes at step S3), then the "master node mode" is determined, and the operation mode 160 of its own node is set to be the "master node mode" (step S4).

If the transfer sequence is not "1" (No at step S3), then the "cluster node mode" is determined, and the operation mode 160 of its own node is set to be the "cluster node mode" (step S5). Thereafter however, as a result of the aftermentioned cluster division, if there is a request from the master node 1 to change the operation mode to the relay cluster node mode (Yes at step S6, step S7 and step S8), then the cluster node receiving the request sets the operation mode 160 of its own node to be the "relay cluster node mode" (step S9). Then, each of the nodes 1 to N operates in the mode set in the operation mode 160 of its own node.

Then, in order to stay informed of the status of the subordinate cluster nodes 2 to N, the master node 1 notifies the cluster nodes of a status confirmation request with a certain period by means of the request notification processing portion 121. The operation due to this request notification processing portion 121 will be explained in reference to FIG. 7. First, the request notification processing portion 121 acquires the node list stored in the data portion 103 of its own node (step S11). Then, excluding the nodes abnormal in status from the node list (step S12), it confirms the cluster nodes listed after its own node and the last cluster node (steps S13 and S14). Subsequently, the request notification processing portion 121 acquires the starting time of notification and, meanwhile, notifies the cluster node 2 listed next to its own node of the request information (step S16) and waits for the notification of the request information from the last cluster node (step S17).

Figure 8:
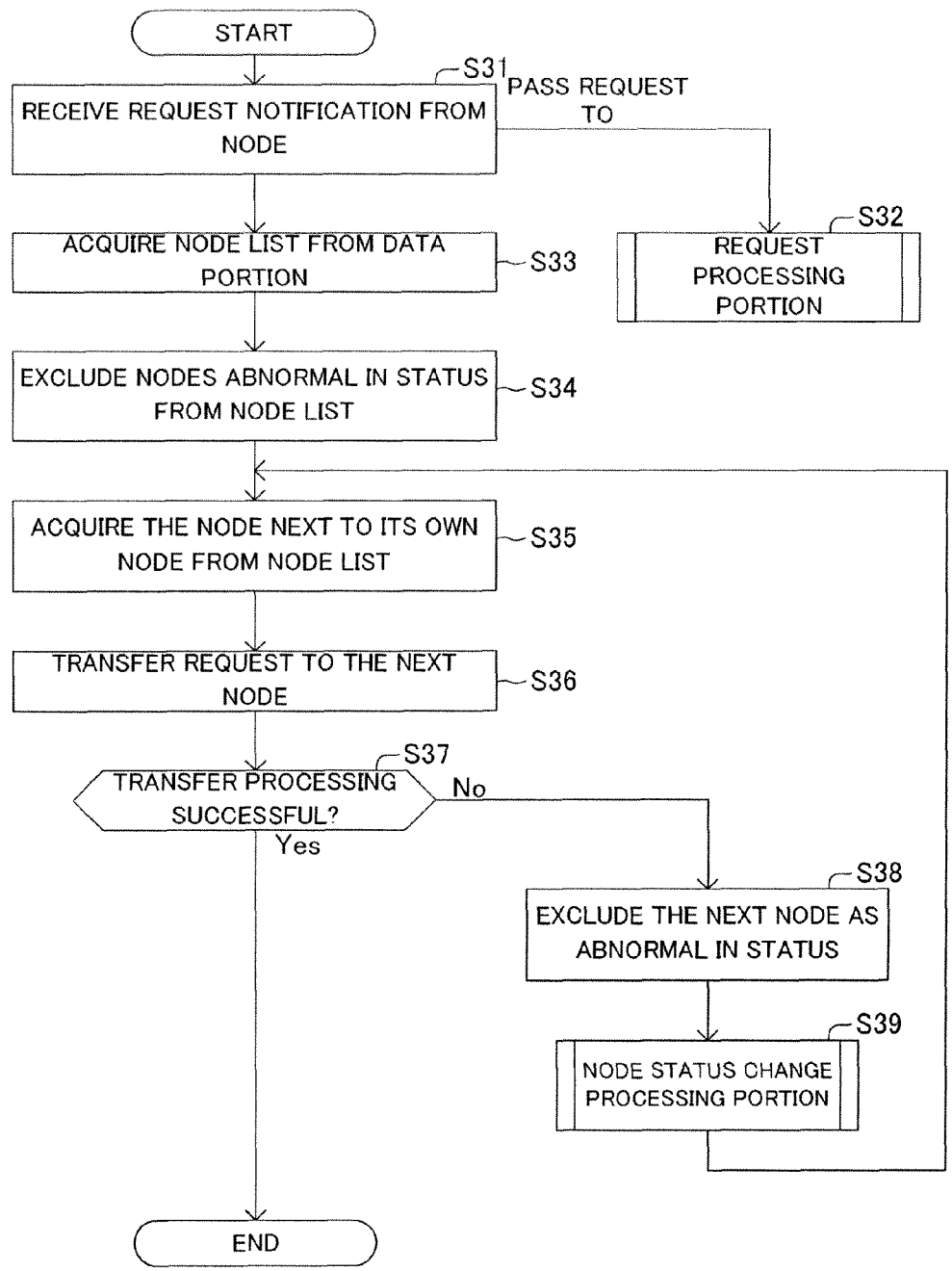
FIG. 8 is a flowchart showing still another operation of the information processing system.
Figure 9:
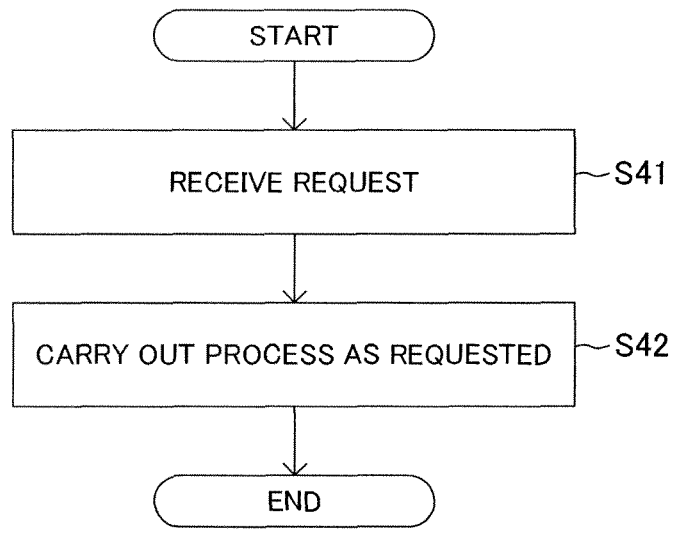
FIG. 9 is a flowchart showing still another operation of the information processing system.

Hereinbelow, referring to FIG. 8, explanations will be made with respect to the operation due to the request transfer processing portion 131 of the cluster nodes 2 to N positioned under the master node 1. First, if the notification of request has come from the master node 1, then the cluster node 2 shown by the numeral 2 in FIG. 1 accepts the request by means of the request transfer processing portion 131 (step S31). Then, it passes the accepted request to the relevant request processing portion 132 to carry out a process in response to the request (step S32). Further, the request processing operation due to the request processing portion 132 is carried out as shown in steps S41 and S42 of FIG. 9.

Along with this operation, the cluster node 2 acquires the node list stored in the data portion 103 of its own node (step S33), excludes the nodes abnormal in status from the node list (step S34), and transfers the request to the cluster node 3 listed next to its own node in the node list (steps S35 and S36). At this time, if the transfer process is successful (Yes at step S37), then the cluster node 3 and the succeeding cluster nodes receiving the transfer of this request transfer the request to the cluster nodes listed next to its own node in the same manner as described above (steps S31 to S37). On the other hand, if there is no cluster node in the node list to transfer next from the cluster nodes receiving the transfer of the request, then the present cluster node transfers the request to the master node 1 (step S36). In the case of FIG. 1, the cluster node N with the numeral N transfers the request to the master node 1.

Figure 10:
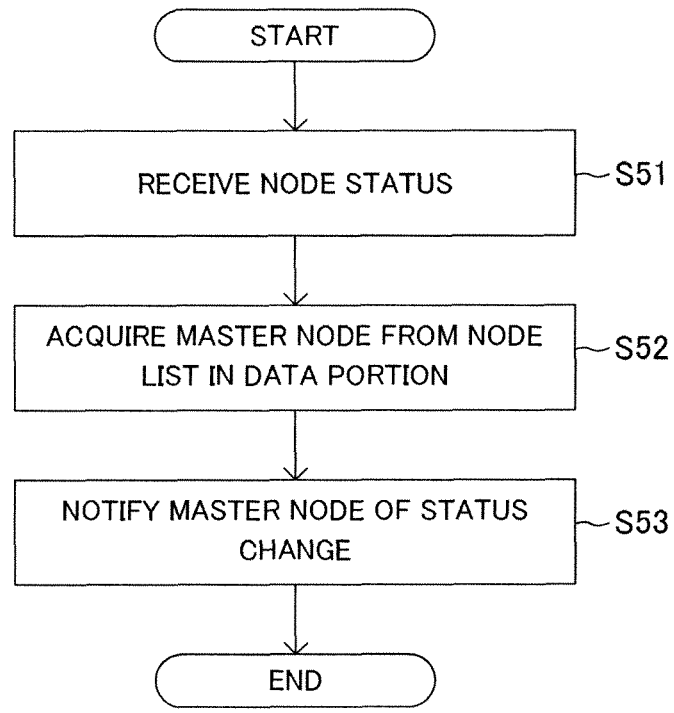
FIG. 10 is a flowchart showing still another operation of the information processing system.

Further, when the cluster node transfers the request to another cluster node, if no response is made by the cluster node of the transfer destination, then the node status change processing portion 133 of the former cluster node operates as shown in FIG. 10. In particular, it changes the status of the corresponding node of no response to abnormal in the node list (steps S51 and S52). Further, the node status change processing portion 133 requests the master node 1 to change the node list (step S53) to carry out the process of transferring the request over again.

Figure 11:
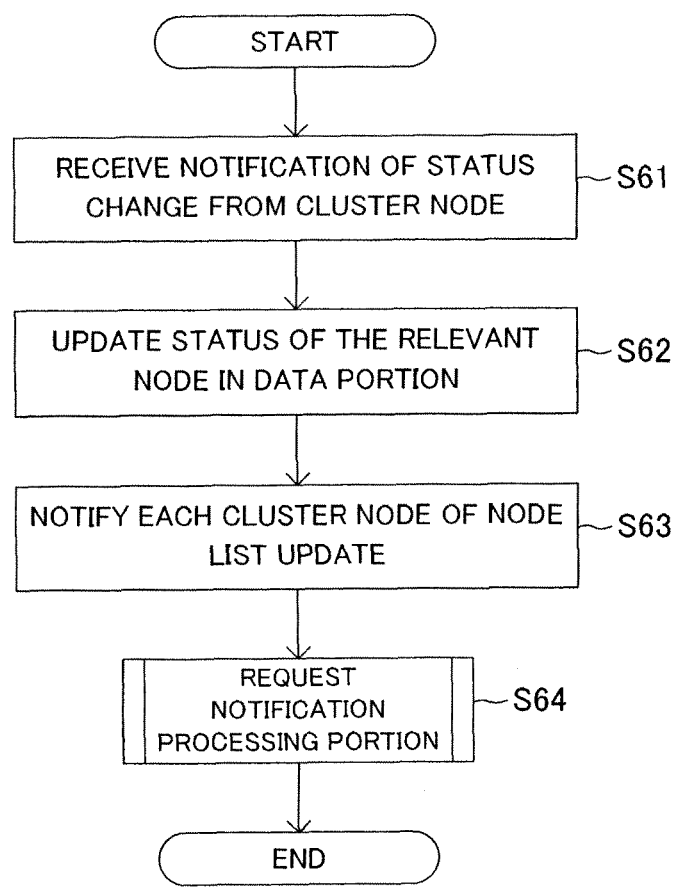
FIG. 11 is a flowchart showing still another operation of the information processing system.

Then, as described hereinbefore, the node list management processing portion 123 of the master node 1 receiving the request to change the node list operates as shown in FIG. 11. In particular, the node list management processing portion 123 first updates the node list according to the received change request (steps S61 and S62). Then, the request notification processing portion 121 carries out the notification of the request to change the node list of each cluster node (steps S63 and S64). Further, the notification of the request is, in the same manner as described hereinabove, transferred to each node.

In the above manner, various requests from the master node 1 are transferred among the cluster nodes. Now, returning to FIG. 7, explanations will be made with respect to the operation when the notification of request information has come thereafter to the master node 1 from the last cluster node. On receiving the notification of request information form the last cluster node and leaving no other clusters to transfer (step S18), the request notification processing portion 121 of the master node 1 acquires the time of receiving the notification (step S19), and calculates the time interval RT after notifying the first cluster node of the request until the notification has come from the last cluster node (step S20). Then, this time interval RT is compared with a preset arbitrary constant T (step S21). If RT is greater than T, then the master node 1 requests the cluster division processing portion 122 for the cluster division process (step S22). Further, T is taken as the result of adding an arbitrary time-out period to the average time of communications between the nodes multiplied by the node number.

Figure 5:
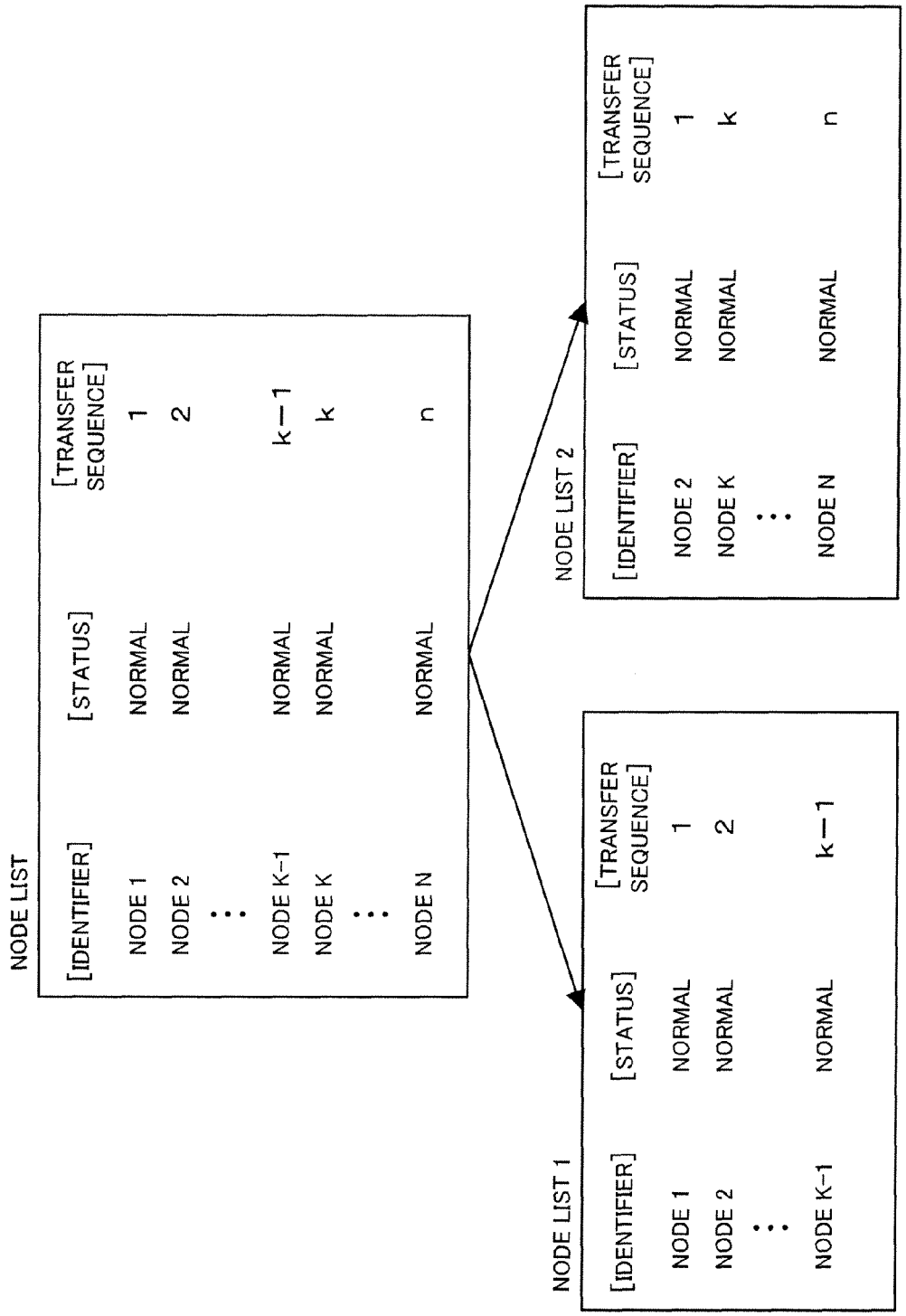
FIG. 5 shows other examples of node lists.
Figure 6:
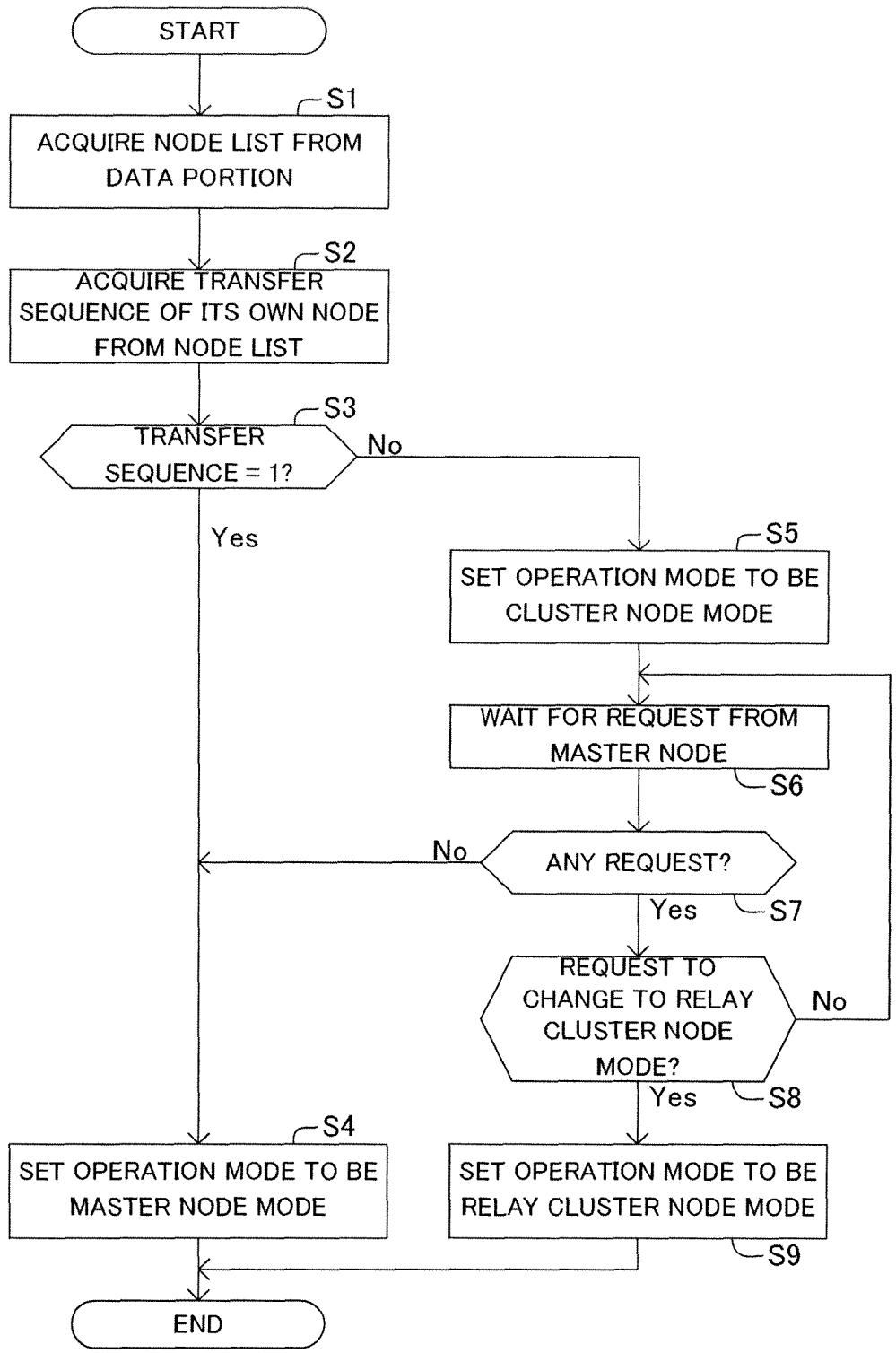
FIG. 6 is a flowchart showing an operation of the information processing system.
Figure 7:
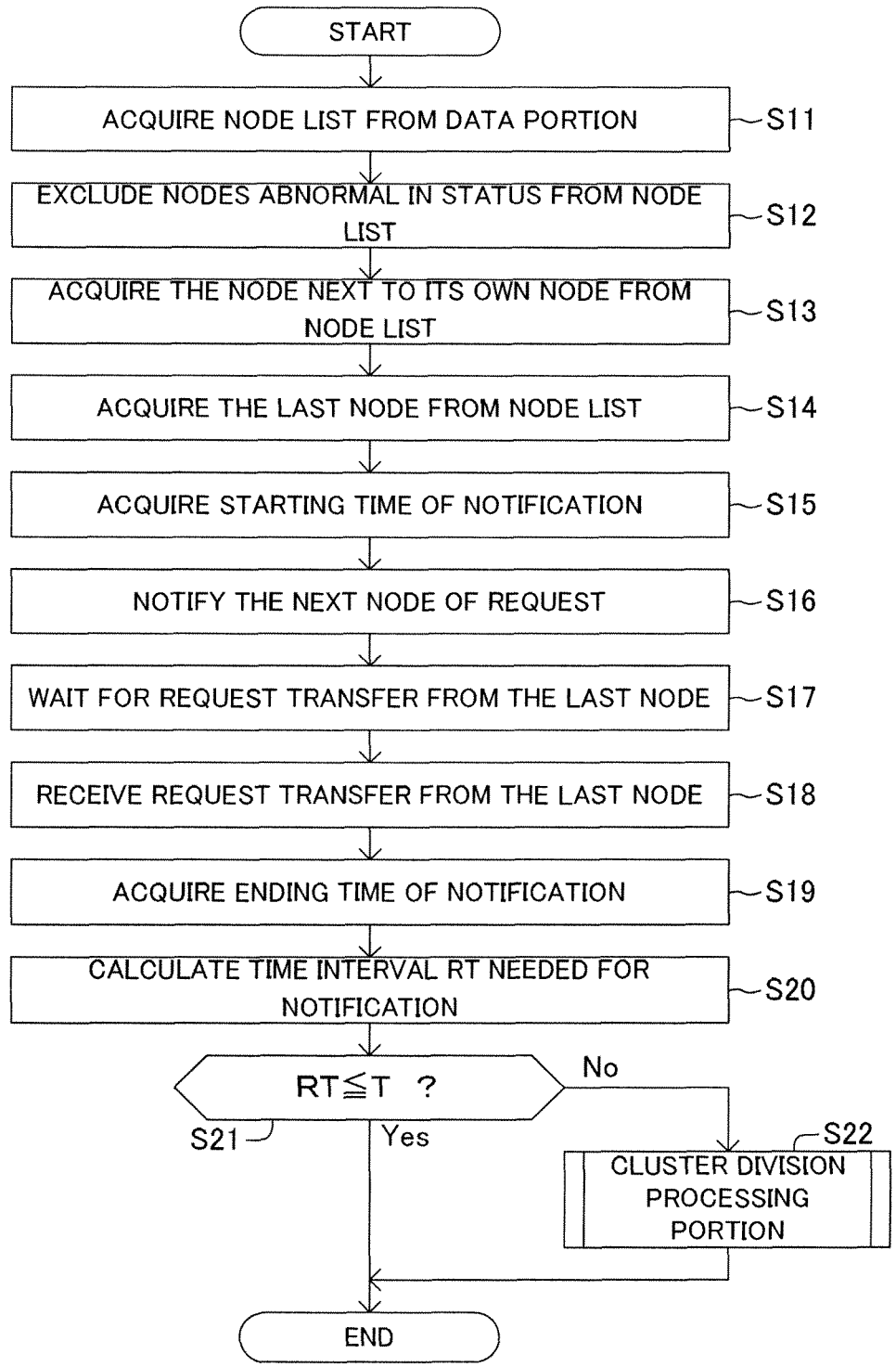
FIG. 7 is a flowchart showing another operation of the information processing system.
Figure 12:
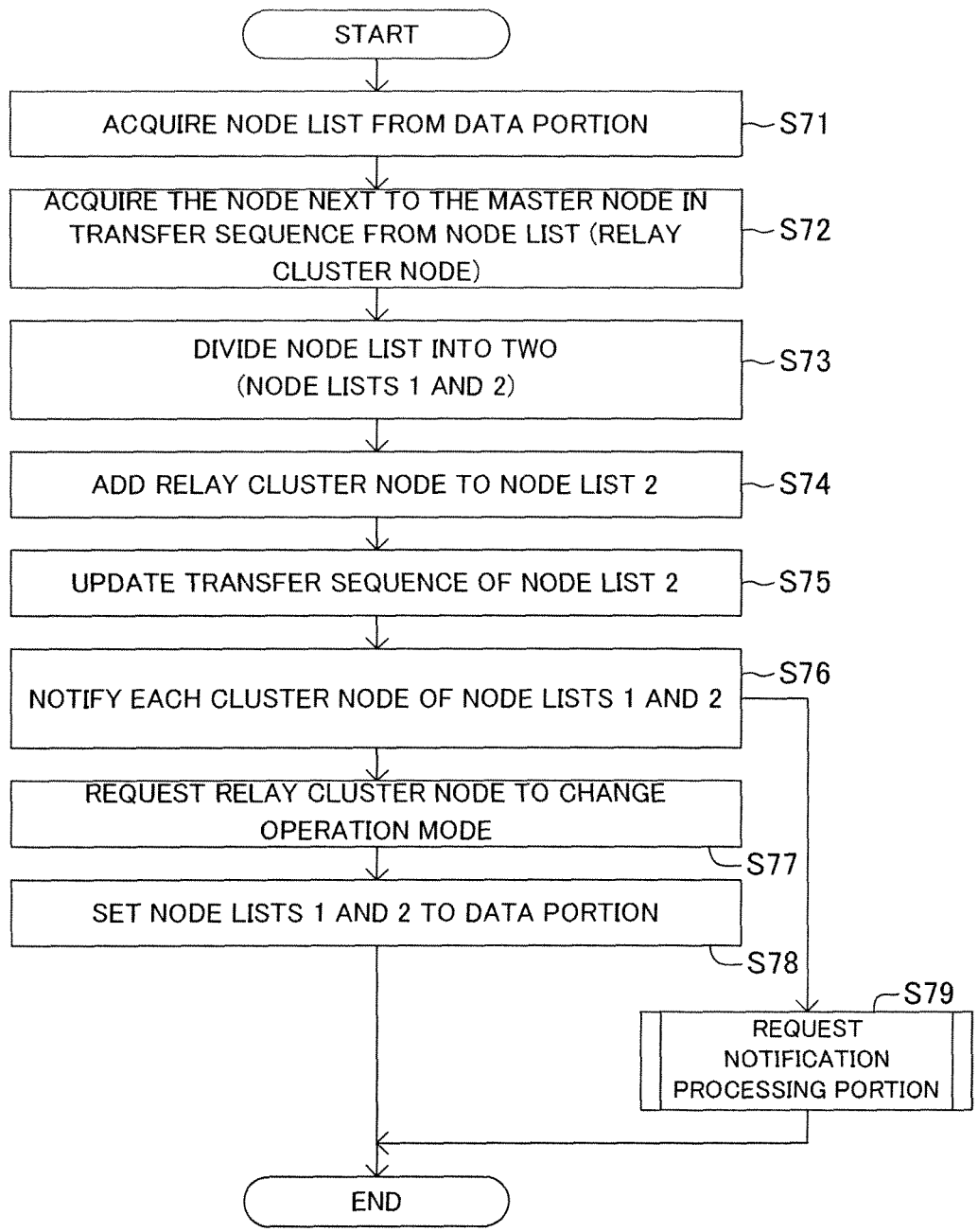
FIG. 12 is a flowchart showing still another operation of the information processing system.

Next, referring to FIG. 12, explanations will be made with respect to the cluster division process due to the cluster division processing portion 122. The cluster division processing portion 122 selects the cluster node of the second transfer sequence as the relay cluster node from the node list stored in the data portion 103 of the master node 1 (steps S71 and S72). Further, it selects an arbitrary node, as shown in FIG. 5, to create a node list 1 from the first node in the node list to the arbitrary node, and a node list 2 combining the relay cluster node with the nodes from the node next to the arbitrary node to the last node (steps S73 and S74). At this time, the transfer sequence of the relay cluster node in the node list 2 is updated to be "1" (step S75).

Then, the cluster division processing portion 122 updates the node list of each cluster node by passing the created node list 1 and the node list 2 to the request notification processing portion 121 (steps S76 and S79).

Subsequently, the cluster division processing portion 122 directly notifies the relay cluster node of the request to change the operation mode (step S77). Thereby, the relay cluster node changes the operation mode 160 stored in the data portion 103 of its own node to the "relay cluster mode" by means of the operation mode determination processing portion 110. Further, the master node 1 stores the created node lists 1 and 2 into the data portion 103 (step S78).

Figure 13:
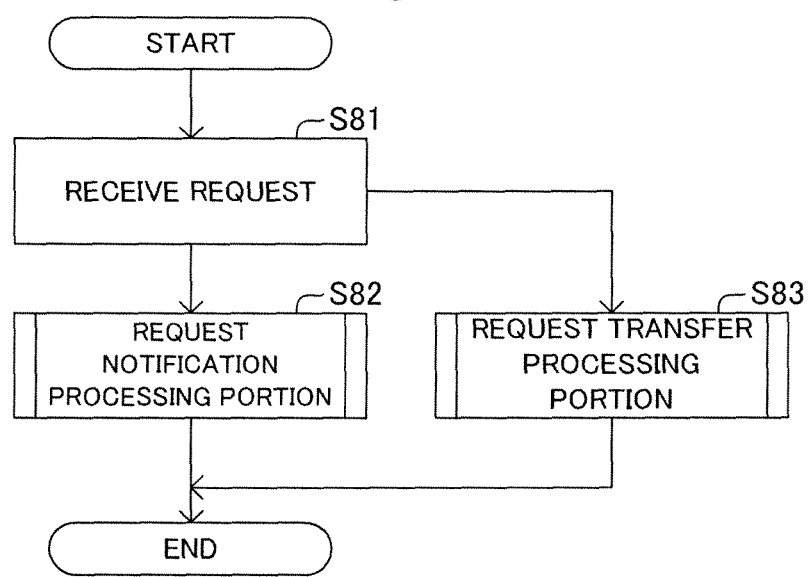
FIG. 13 is a flowchart showing still another operation of the information processing system.

In the above manner, if a cluster is divided as shown in FIG. 2, then the relay processing portion 141 of the relay cluster node 2 shown by the numeral 2 belongs to both clusters (the clusters 1 and 2), and operates in the manner as shown in FIG. 13. That is, the relay cluster node 2 first responds to the request information from the master node 1 (step S81), acts as the cluster node 2 in the cluster 1, refers to the node list of the cluster 1 by means of the request transfer processing portion 131, and transfers the request information to the next cluster node (step S83). At the same time, the relay cluster node 2 also acts as the maser node in the cluster 2, refers to the node list of the luster 2 by means of the request notification processing portion 121, and transfers the request information to the next cluster node positioned thereunder.

Then, because each piece of transferred request information is transferred between the respective cluster nodes as described hereinbefore, it is possible to transmit a request from the maser node to all cluster nodes.

Here, by taking the cluster nodes positioned under the master node 1 as the relay cluster nodes, respectively, to constitute each new cluster, it is possible to respond to a great number of nodes. For example, as shown in FIG. 14, a cluster 1 is constituted by N nodes (one master node and N−1 cluster nodes). All the cluster nodes are taken as relay cluster nodes, and N−1 cluster nods are disposed under each of these relay cluster nodes to constitute clusters 1, 2, 3, and 4. By virtue of this, excluding the master node, it is possible to increase the total number of nodes up to $\{(N-1)+(N-1)^2\}$ and, meanwhile, it is possible to restrain the RT from exceeding (T×2).

Further, though not shown, it is possible to increase the node number by taking each cluster node under the relay cluster nodes shown in FIG. 14 as a relay cluster node and disposing N−1 cluster nodes under each new relay cluster node. In this case, excluding the master node, it is possible to increase the total number of nodes up to $\{(N-1)+(N-1)^2+(N-1)^3\}$ and, meanwhile, it is possible to restrain the RT from exceeding (T×3). At this time, the request from the master node needs to pass through the relay cluster node twice to reach the terminal cluster node.

In the same manner, it is possible to further increase the node number by taking cluster nodes as relay cluster nodes. Then, supposing the number of times for a request to pass through the relay cluster node is P−1, then excluding the master node, the total node number is $\{(N-1)+(N-1)^2+\ldots+(N-1)^P\}$, and the RT can be restrained from exceeding (T×P).

In the above manner, according to the present invention, because the master node only needs to notify one cluster node of a request, compared with the case of carrying out communications with each cluster node on a one-to-one basis, it is possible to keep the load on the master node at a constant level regardless of the number of cluster nodes.

Further, even if the number of cluster nodes is increased, by dividing the clusters dynamically, it is still possible to transfer the request of the master node concurrently with the clusters under the master node and with the divided clusters. Thereby, it is possible to maintain the time interval below a certain period for the request from the maser node to reach all cluster nodes. As a result, it is possible to facilitate the reduction of the management time for an information system composed of a plurality of computers.

Here, in the above explanations, a cluster is constituted in the unit of (physical) nodes. However, by internally dividing a node into a plurality of logical partitions, it is possible to establish a plurality of cluster configurations with the entire nodes. For example, when executing applications A and B of different types inside a node, by internally dividing the node into two logical partitions, logical clusters can be constituted separately. Thereby, it is possible to constitute clusters independent of the physical configuration of a node.

Further, in the above exemplary embodiment, computer programs are stored in a storage device or a recording medium readable by a computer. For example, the recording medium may be a portable medium such as a flexible disk, optical disk, magneto-optical disk, semiconductor memory, and the like.

While the present invention has been particularly shown and described with reference to the exemplary embodiment thereof, the present invention is not limited to the exemplary embodiment described hereinabove. It will be understood by those of ordinary skill in the art that various changes in form and details may be made therein without departing from the spirit and scope of the present invention as defined by the claims.

<Supplementary Notes>

The whole or part of the exemplary embodiment disclosed above can be described as, but not limited to, the following supplementary notes. Hereinbelow, explanations will be made with respect to an outline of the configuration of an information processing system, a master node, a computer program, and an information processing method in accordance with the present invention. However, the present invention is not limited to the following configuration.

(Supplementary Note 1)

An information processing system comprising:

a master node; and a plurality of cluster nodes managed by the master node, wherein the information processing system stores a node list having set a transfer sequence for transferring request information sent from the master node to the cluster nodes;

wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist;

wherein the master node includes a request notification unit for sending the request information to one of the cluster nodes according to the node list, and a cluster division unit for dividing the plurality of cluster nodes according to the time interval after sending the request information until receiving the request information sent from other of the cluster nodes; and wherein the cluster division unit divides the plurality of cluster nodes into a first cluster node group positioned under the management of the master node, and a second cluster node group positioned under the management of a predetermined cluster node.

(Supplementary Note 2)

The information processing system according to Supplementary Note 1, wherein the cluster division unit divides the plurality of cluster nodes into a first cluster node group positioned under the management of the master node, and a second cluster node group positioned under the management of a relay cluster node by taking one of the cluster nodes in the first cluster group as the relay cluster node.

(Supplementary Note 3)

The information processing system according to Supplementary Note 2, wherein the cluster division unit creates and stores a node list having net a transfer sequence for transferring the request information from the master node in correspondence with the first cluster node group positioned under the management of the master node and another node list having set a transfer sequence for transferring the request information from the relay cluster node in correspondence with the second cluster node group positioned under the management of the relay cluster node; and the request transfer unit included in the cluster node taken as the relay cluster node transfers the request information according to the node list in correspondence with the first cluster node group positioned under the management of the master node, and transfers the request information to other of the cluster nodes which are the next transfer destinations according to the node list in correspondence with the second cluster node group positioned under the management of the relay cluster node, i.e., its own device.

(Supplementary Note 4)

The information processing system according to Supplementary Note 2 or 3, wherein the cluster division unit divides the plurality of cluster nodes such that the number of the cluster nodes positioned under the management of the master node becomes the same as the number of the cluster nodes positioned under the management of the relay cluster node.

(Supplementary Note 5)

The information processing system according to any one of Supplementary Notes 1 to 4, wherein the cluster division unit divides the plurality of cluster nodes when the time interval after sending the request information until receiving the request information sent from other of the cluster nodes is greater than a preset threshold value.

(Supplementary Note 6)

A master node for managing a plurality of cluster nodes, the master node storing anode list having set a transfer sequence for transferring request information sent from the master node to the cluster nodes, the master node comprising:

a request notification unit for sending the request information to one of the cluster nodes according to the node list; and a cluster division unit for dividing the plurality of cluster nodes according to the time interval after sending the request information until receiving the request information sent from other of the cluster nodes, wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist; and wherein the cluster division unit divides the plurality of cluster nodes into a first cluster node group positioned under the management of the master node, and a second cluster node group positioned under the management of a predetermined cluster node.

(Supplementary Note 7)

The master node according to Supplementary Note 6, wherein the cluster division unit divides the plurality of cluster nodes into a first cluster node group positioned under the management of the master node, and a second cluster node group positioned under the management of a relay cluster node by taking one of the cluster nodes in the first cluster group as the relay cluster node.

(Supplementary Note 8)

A computer program installed into a master node storing a node list having set a transfer sequence for transferring request information to a plurality of cluster nodes to manage the cluster nodes, the computer program comprising instructions for causing the master node to realize:

a request notification unit for sending the request information to one of the cluster nodes according to the node list; and a cluster division unit for dividing the plurality of cluster nodes according to the time interval after sending the request information until receiving the request information sent from other of the cluster nodes, wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist; and wherein the cluster division unit divides the plurality of cluster nodes into a first cluster node group positioned under the management of the master node, and a second cluster node group positioned under the management of a predetermined cluster node.

(Supplementary Note 9)

The computer program according to Supplementary Note 8, wherein the cluster division unit divides the plurality of cluster nodes into a first cluster node group positioned under the management of the master node, and a second cluster node group positioned under the management of a relay cluster node by taking one of the cluster nodes in the first cluster group as the relay cluster node.

(Supplementary Note 10)

An information processing method based on an information processing system comprising a master node, and a plurality of cluster nodes managed by the master node, the method comprising:

sending request information to one of the cluster nodes according to a node list having set a transfer sequence for transferring the request information sent from the master node to the cluster nodes, by means of the master node;

accepting the request information sent from the master node or other of the cluster nodes, transferring the request information to yet other of the cluster nodes which are the next transfer destinations according to the node list, and transferring the request information to the master node if the next transfer destinations do not exist, by means of the cluster nodes; and dividing the plurality of cluster nodes according to the time interval after sending the request information until receiving the request information sent from other of the cluster nodes, by means of the master node, wherein in dividing the plurality of cluster nodes, the master node divides the plurality of cluster nodes into a first cluster node group positioned under the management of the master node, and a second cluster node group positioned under the management of a predetermined cluster node.

(Supplementary Note 11)

The information processing method according to Supplementary Note 10, wherein in dividing the plurality of cluster nodes, the master node divides the plurality of cluster nodes into a first cluster node group positioned under the management of the master node, and a second cluster node group positioned under the management of a relay cluster node by taking one of the cluster nodes in the first cluster group as the relay cluster node.

Further, the present application claims priority from Japanese Patent Application No. 2011-36660, filed on Feb. 23, 2011 in Japan, the disclosure of which is incorporated herein by reference in its entirety.

The invention claimed is:

1. An information processing system comprising:
a master node; and
a plurality of cluster nodes managed by the master node,
wherein the information processing system stores a node list having set a transfer sequence for transferring request information sent from the master node to the cluster nodes;
wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist;
wherein the master node includes a request notification unit for sending the request information to one of the cluster nodes according to the node list, and a cluster division unit for dividing the plurality of cluster nodes in a case that a calculated amount of time is larger than a preset threshold value, wherein the amount of time is calculated based on a time interval after sending the request information from the master node to the one of the cluster nodes until receiving the request information by the master node, wherein the request information is sent from another of the cluster nodes in which the next transfer destinations do not exist; and
wherein the cluster division unit divides the plurality of cluster nodes into a first cluster node group positioned under the management of the master node, and a second cluster node group positioned under the management of a predetermined cluster node.

2. The information processing system according to claim 1, wherein the cluster division unit divides the plurality of cluster nodes into a first cluster node group positioned under the management of the master node, and a second cluster node group positioned under the management of a relay cluster node by taking one of the cluster nodes in the first cluster group as the relay cluster node.

3. The information processing system according to claim 2, wherein the cluster division unit creates and stores a node list having set a transfer sequence for transferring the request information from the master node in correspondence with the first cluster node group positioned under the management of the master node and another node list having set a transfer sequence for transferring the request information from the relay cluster node in correspondence with the second cluster node group positioned under the management of the relay cluster node; and the request transfer unit included in the cluster node taken as the relay cluster node transfers the request information according to the node list in correspondence with the first cluster node group positioned under the management of the master node, and transfers the request information to other of the cluster nodes which are the next transfer destinations according to the node list in correspondence with the second cluster node group positioned under the management of the relay cluster node, i.e., its own device.

4. The information processing system according to claim 2, wherein the cluster division unit divides the plurality of cluster nodes such that the number of the cluster nodes positioned under the management of the master node becomes the same as the number of the cluster nodes positioned under the management of the relay cluster node.

5. The information processing system according to claim 1, wherein the cluster division unit divides the plurality of cluster nodes when the time interval after sending the request information until receiving the request information sent from other of the cluster nodes is greater than a preset threshold value.

6. A master node for managing a plurality of cluster nodes, the master node storing a node list having set a transfer sequence for transferring request information sent from the master node to the a plurality of cluster nodes being managed by the master node, the master node comprising:
a request notification unit, stored in a non-transitory computer readable medium and executed by a processor, for sending the request information to one of the cluster nodes according to the node list; and
a cluster division unit, stored in the non-transitory computer readable medium and executed by the processor, for dividing the plurality of cluster nodes according to the time interval in a case that a calculated amount of time is larger than a preset threshold value, wherein the amount of time is calculated based on a time interval after sending the request information from the master node to the one of the cluster nodes until receiving the request information by the master node,
wherein the request information is sent from another of the cluster nodes in which the next transfer destinations do not exist; and
wherein the cluster nodes each include a request transfer unit for accepting the request information sent from the master node or other of the cluster nodes, transferring the request information to yet other of the cluster nodes which are the next transfer destinations according to the node list, and transferring the request information to the master node if the next transfer destinations do not exist; and
wherein the cluster division unit divides the plurality of cluster nodes into a first cluster node group positioned under the management of the master node, and a second cluster node group positioned under the management of a predetermined cluster node.

7. The master node according to claim 6, wherein the cluster division unit divides the plurality of cluster nodes into a first cluster node group positioned under the management of the master node, and a second cluster node group positioned under the management of a relay cluster node by taking one of the cluster nodes in the first cluster group as the relay cluster node.

8. An information processing method based on an information processing system comprising a master node, and a plurality of cluster nodes managed by the master node, the method comprising:
sending request information to one of the cluster nodes according to a node list having set a transfer sequence for transferring the request information sent from the master node to the cluster nodes, by means of the master node;
accepting the request information sent from the master node or other of the cluster nodes, transferring the request information to yet other of the cluster nodes which are the next transfer destinations according to the node list, and transferring the request information to the master node if the next transfer destinations do not exist, by means of the cluster nodes; and
dividing the plurality of cluster nodes in a case that a calculated amount of time is larger than a preset threshold value, wherein the amount of time is calculated based on a time interval after sending the request information from the master node to the one of the cluster nodes until receiving the request information by the master node, wherein the request information is sent from another of the cluster nodes in which the next transfer destinations do not exist; and wherein in dividing the plurality of cluster nodes, the master node divides the plurality of cluster nodes into a first cluster node group positioned under the management of the master node, and a second cluster node group positioned under the management of a predetermined cluster node.

9. The information processing method according to claim 8, wherein in dividing the plurality of cluster nodes, the master node divides the plurality of cluster nodes into a first cluster node group positioned under the management of the master node, and a second cluster node group positioned under the management of a relay cluster node by taking one of the cluster nodes in the first cluster group as the relay cluster node.

* * * * *